US010636326B2

(12) United States Patent
Takeuchi

(10) Patent No.: US 10,636,326 B2
(45) Date of Patent: Apr. 28, 2020

(54) IMAGE PROCESSING APPARATUS, IMAGE PROCESSING METHOD, AND COMPUTER-READABLE STORAGE MEDIUM FOR DISPLAYING THREE-DIMENSIONAL VIRTUAL OBJECTS TO MODIFY DISPLAY SHAPES OF OBJECTS OF INTEREST IN THE REAL WORLD

(71) Applicant: SONY CORPORATION, Tokyo (JP)

(72) Inventor: Yuichiro Takeuchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 120 days.

(21) Appl. No.: 15/358,480

(22) Filed: Nov. 22, 2016

(65) Prior Publication Data
US 2017/0076638 A1    Mar. 16, 2017

Related U.S. Application Data

(63) Continuation of application No. 13/246,159, filed on Sep. 27, 2011, now Pat. No. 9,536,454.

(30) Foreign Application Priority Data

Oct. 1, 2010   (JP) ................ 2010-224347

(51) Int. Cl.
*G09B 29/10*     (2006.01)
*G09B 29/12*     (2006.01)
(Continued)

(52) U.S. Cl.
CPC .............. *G09B 29/106* (2013.01); *G06T 7/75* (2017.01); *G06T 13/20* (2013.01); *G06T 17/05* (2013.01); *G06T 19/006* (2013.01); *G06T 19/20* (2013.01); *G09B 29/102* (2013.01); *G09B 29/12* (2013.01); *G06T 2200/08* (2013.01); *G06T 2215/12* (2013.01); *G06T 2215/16* (2013.01); *G06T 2219/2016* (2013.01)

(58) Field of Classification Search
None
See application file for complete search history.

(56) References Cited

U.S. PATENT DOCUMENTS 5,262,856 A * 11/1993 Lippman ................ H04N 5/272
                                                348/469
5,467,441 A * 11/1995 Stone .................... G06T 3/0018
                                                345/619
(Continued)

FOREIGN PATENT DOCUMENTS

JP    2005-227590    8/2005

*Primary Examiner* — Michelle M Entezari
(74) *Attorney, Agent, or Firm* — Paratus Law Group, PLLC

(57) ABSTRACT

A method is provided for displaying physical objects. The method comprises capturing an input image of physical objects, and matching a three-dimensional model to the physical objects. The method further comprises producing a modified partial image by at least one of modifying a portion of the matched three-dimensional model, or modifying a partial image extracted from the input image using the matched three-dimensional model. The method also comprises displaying an output image including the modified partial image superimposed over the input image.

16 Claims, 10 Drawing Sheets

(51) Int. Cl.
*G06T 7/73* (2017.01)
*G06T 13/20* (2011.01)
*G06T 17/05* (2011.01)
*G06T 19/00* (2011.01)
*G06T 19/20* (2011.01)

(56) References Cited

U.S. PATENT DOCUMENTS

| | | | |
|---|---|---|---|
| 5,594,850 A | 1/1997 | Noyama et al. | |
| 5,701,403 A | 12/1997 | Watanabe et al. | |
| 6,229,546 B1 | 5/2001 | Lancaster et al. | |
| 6,492,990 B1 | 12/2002 | Peleg et al. | |
| 6,512,857 B1 | 1/2003 | Hsu et al. | |
| 6,529,626 B1 | 3/2003 | Watanabe et al. | |
| 6,650,326 B1 | 11/2003 | Huber et al. | |
| 6,980,697 B1 * | 12/2005 | Basso | G06T 15/50 348/14.01 |
| 7,102,634 B2 | 9/2006 | Kim et al. | |
| 7,193,633 B1 | 3/2007 | Reinhardt et al. | |
| 7,327,364 B2 | 2/2008 | Ohba et al. | |
| 7,518,640 B2 | 4/2009 | Nakajima et al. | |
| 7,929,800 B2 | 4/2011 | Meadow et al. | |
| 7,948,451 B2 * | 5/2011 | Gustafsson | G02B 27/017 345/633 |
| 8,134,558 B1 * | 3/2012 | Mayhew | G06T 13/80 345/419 |
| 8,391,642 B1 | 3/2013 | Petruszka et al. | |
| 8,542,252 B2 * | 9/2013 | Perez | G06K 9/00201 345/420 |
| 8,670,046 B2 | 3/2014 | Ohba et al. | |
| 8,698,841 B2 | 4/2014 | Olsen | |
| 8,749,573 B2 * | 6/2014 | Ali | G02B 27/0176 345/592 |
| 8,811,764 B1 | 8/2014 | Hsu | |
| 8,823,707 B2 | 9/2014 | Barcay et al. | |
| 9,081,177 B2 * | 7/2015 | Wong | G02B 27/0093 |
| 9,454,850 B2 * | 9/2016 | Jeung | G06T 19/006 |
| 10,019,962 B2 * | 7/2018 | Liu | G02B 27/017 |
| 2002/0018047 A1 | 2/2002 | Okada et al. | |
| 2002/0095276 A1 * | 7/2002 | Rong | G06T 17/00 703/2 |
| 2002/0158905 A1 | 10/2002 | Bazzoni et al. | |
| 2002/0159527 A1 * | 10/2002 | Pelagotti | H04N 5/145 375/240.16 |
| 2002/0190982 A1 * | 12/2002 | Kotcheff | G06T 17/20 345/420 |
| 2003/0043152 A1 * | 3/2003 | Raskar | G06T 13/20 345/473 |
| 2003/0091227 A1 | 5/2003 | Chang et al. | |
| 2003/0108329 A1 | 6/2003 | Adriansen et al. | |
| 2004/0021664 A1 * | 2/2004 | Takemoto | G06T 19/006 345/419 |
| 2004/0030596 A1 | 2/2004 | Attar et al. | |
| 2004/0176908 A1 * | 9/2004 | Senda | G01C 21/3638 701/431 |
| 2005/0024360 A1 * | 2/2005 | Abe | G06F 3/0325 345/419 |
| 2005/0175234 A1 | 8/2005 | Sakamoto | |
| 2006/0044307 A1 * | 3/2006 | Song | G06Q 10/06 345/419 |
| 2006/0223635 A1 * | 10/2006 | Rosenberg | A63F 13/10 463/37 |
| 2007/0076920 A1 * | 4/2007 | Ofek | G06T 3/4038 382/113 |
| 2007/0088497 A1 | 4/2007 | Jung | |
| 2007/0110298 A1 * | 5/2007 | Graepel | G06K 9/00355 382/154 |
| 2007/0258643 A1 | 11/2007 | Lotjonen | |
| 2008/0194323 A1 * | 8/2008 | Merkli | A63F 13/02 463/30 |
| 2008/0219501 A1 | 9/2008 | Matsumoto | |
| 2008/0285854 A1 * | 11/2008 | Kotake | G06T 7/73 382/190 |
| 2009/0019031 A1 * | 1/2009 | Krovitz | G06F 16/54 |
| 2009/0066782 A1 * | 3/2009 | Choi | H04N 3/155 348/25 |
| 2009/0087036 A1 * | 4/2009 | Imaoka | G06K 9/00288 382/118 |
| 2009/0208079 A1 | 8/2009 | Vaillant et al. | |
| 2009/0213270 A1 | 8/2009 | Ismert et al. | |
| 2009/0231347 A1 * | 9/2009 | Omote | G06T 13/205 345/473 |
| 2009/0279784 A1 * | 11/2009 | Arcas | G06T 17/00 382/190 |
| 2009/0315978 A1 * | 12/2009 | Wurmlin | G06T 5/005 348/43 |
| 2010/0201682 A1 | 8/2010 | Quan et al. | |
| 2010/0245387 A1 * | 9/2010 | Bachelder | G06T 19/006 345/633 |
| 2010/0271498 A1 * | 10/2010 | Hwang | G06T 5/50 348/222.1 |
| 2010/0289797 A1 * | 11/2010 | Tateno | G06T 17/00 345/419 |
| 2010/0310154 A1 | 12/2010 | Barrois et al. | |
| 2011/0019878 A1 | 1/2011 | Soubelet et al. | |
| 2011/0123068 A1 | 5/2011 | Miksa et al. | |
| 2011/0130949 A1 * | 6/2011 | Arrasvuori | G01C 21/3638 701/532 |
| 2011/0141109 A1 * | 6/2011 | Radet | G06F 3/0481 345/420 |
| 2011/0227919 A1 | 9/2011 | Bongio et al. | |
| 2012/0069052 A1 * | 3/2012 | Lee | G06F 1/1694 345/633 |
| 2012/0295637 A1 * | 11/2012 | Hannuksela | G01S 3/8034 455/456.1 |
| 2013/0038601 A1 * | 2/2013 | Han | G06T 13/40 345/419 |
| 2014/0300610 A1 * | 10/2014 | Mayhew | G06T 13/00 345/473 |

* cited by examiner

IMAGE PROCESSING APPARATUS, IMAGE PROCESSING METHOD, AND COMPUTER-READABLE STORAGE MEDIUM FOR DISPLAYING THREE-DIMENSIONAL VIRTUAL OBJECTS TO MODIFY DISPLAY SHAPES OF OBJECTS OF INTEREST IN THE REAL WORLD

CROSS-REFERENCE TO RELATED APPLICATIONS

This application is a continuation of U.S. patent application Ser. No. 13/246,159 (filed on Sep. 27, 2011), which claims priority to Japanese Patent Application No. 2010-224347 (filed on Oct. 1, 2010), which are all hereby incorporated by reference in their entirety.

BACKGROUND

Description of the Related Art

The present disclosure relates to an image processing device, program, and method.

In the past, various geographic information services that present to a user geographic information in the real world on a computer screen have been put into practical use. For example, through the use of common map retrieval services opened to the public on the Web, a user can easily obtain a map of a region including locations corresponding to desired place-names, addresses, or names of landmarks, etc. On any maps displayed in map retrieval services, it is also possible to place a mark on each facility that complies with the keyword designated by a user.

Furthermore, in recent years, the spectacularly improved computer performance allows not only a two-dimensional, planar map but also information on three-dimensional space to be treated with a user terminal. For example, Japanese Patent Application Laid-Open No. 2005-227590 proposes displaying a two-dimensional map and a three-dimensional image around a current location in parallel in an output image from a map guiding device.

SUMMARY

However, in the method by which a three-dimensional image of an overhead view from a certain viewpoint at a designated location is just displayed, the viewpoint of the displayed three-dimensional image differs from the viewpoint of a user in the real space. Therefore, when the user tries to find the desired building or facility, etc. in the real space, to which he or she wants to go, a comparison of a view that the user sees in the real world around him or her and the three-dimensional image does not yield a match, and thus the user may have difficulty locating the desired building or facility, etc., easily.

Therefore, it is desirable to provide a novel and improved image information processing apparatus, image processing method, and computer-readable storage medium that facilitate finding an object, such as a desired building or facility, in the real space.

Accordingly, there is provided an apparatus for displaying physical objects. The apparatus comprises a capturing unit for capturing an input image of physical objects. The apparatus further comprises a matching unit for matching a three-dimensional model to the physical objects. The apparatus also comprises a processing unit for producing a modified partial image by at least one of modifying a portion of the matched three-dimensional model, or modifying a partial image extracted from the input image using the matched three-dimensional model. The apparatus also comprises a display generator for generating signals representing an output image, the output image including the modified partial image superimposed over the input image.

In another aspect, there is provided a method for displaying physical objects. The method comprises capturing an input image of physical objects, and matching a three-dimensional model to the physical objects. The method further comprises producing a modified partial image by at least one of modifying a portion of the matched three-dimensional model, or modifying a partial image extracted from the input image using the matched three-dimensional model. The method also comprises displaying an output image including the modified partial image superimposed over the input image.

In another aspect, there is provided a tangibly-embodied non-transitory computer-readable storage medium storing instructions which, when executed by a processor, cause a computer to perform a method for displaying physical objects. The method comprises capturing an input image of physical objects, and matching a three-dimensional model to the physical objects. The method further comprises producing a modified partial image by at least one of modifying a portion of the matched three-dimensional model, or modifying a partial image extracted from the input image using the matched three-dimensional model. The method also comprises displaying an output image including the modified partial image superimposed over the input image.

According to the embodiments described above, there are provided an information processing apparatus, information processing method, and computer-readable storage medium, finding an object, such as a desired building or facility in the real space, can be facilitated.

DETAILED DESCRIPTION OF THE EMBODIMENT(S)

Figure 1:
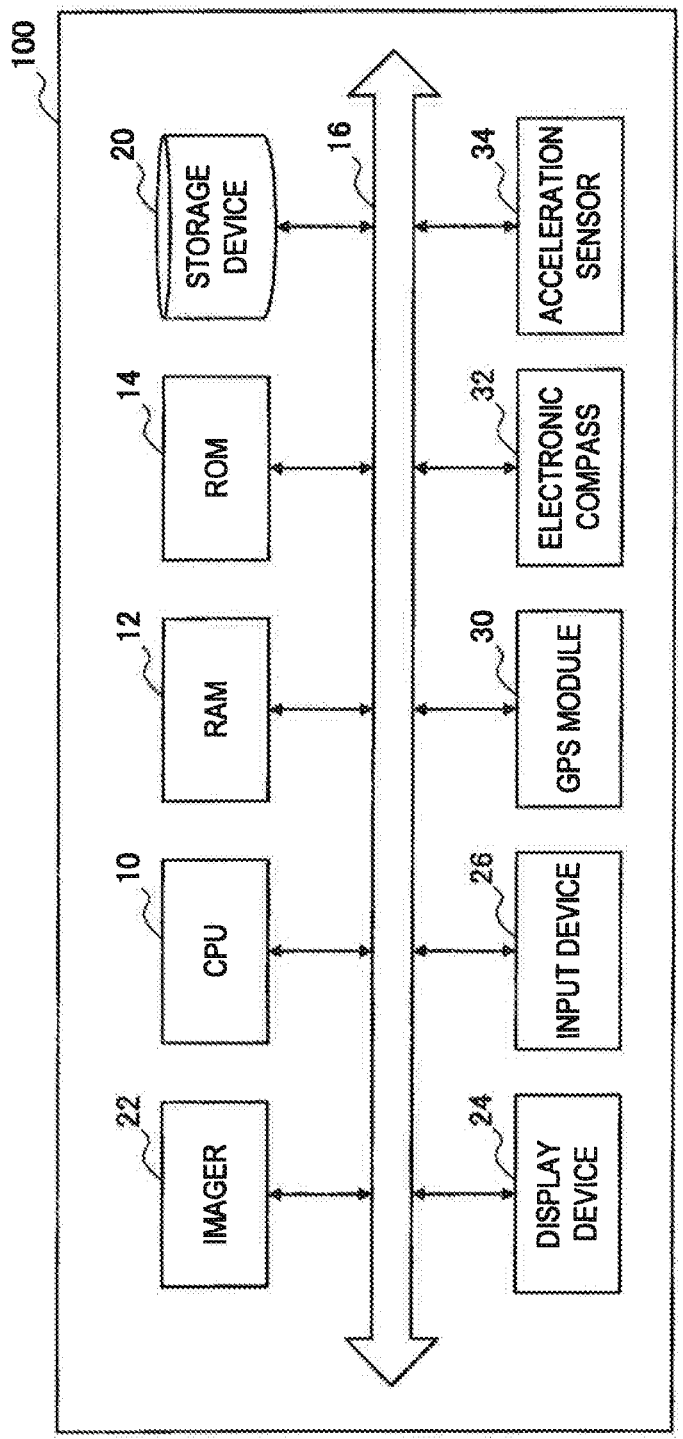
FIG. 1 is a block diagram illustrating an example of a hardware configuration of an image processing device according to an embodiment.

In the following, an embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

It is to be noted that the description is described below in accordance with the following order.

1. Configuration Example of Image Processing Device
1-1. Hardware Configuration
1-2. Logical Configuration
2. Examples of Processes of Emphasizing
2-1. First Example
2-2. Second Example
2-3. Third Example
3. Example of Flow of Image Processing
4. Conclusion

1. Configuration Example of Image Processing Device

First, an example of a configuration of an image processing device according to an embodiment will be described with reference to FIGS. 1 to 6. Examples of the image processing device described herein include a personal computer (PC), a smartphone, a personal digital assistant, a digital camera, a car-mounted or handheld navigational device, or a handheld video game machine.

1-1. Hardware Configuration

FIG. 1 is a block diagram illustrating an example of a hardware configuration of an image processing device 100 according to the present embodiment. Referring to FIG. 1, the image processing device 100 includes a central processing unit (CPU) 10, a random access memory (RAM) 12, a read only memory (ROM) 14, a bus 16, a storage device 20, an imager 22, a display device 24, an input device 26, a global positioning system (GPS) module 30, an electronic compass 32, and an acceleration sensor 34.

The CPU 10 generally controls the operation of the image processing device 100 in accordance with programs recorded in ROM 14, storage device 20, and/or RAM 12. The RAM 12 temporarily stores a program and data executed by the CPU 10. The ROM 14 may be a nonvolatile memory for storing the program for operation of the image processing device 100. The bus 16 interconnects the CPU 10, RAM 12, ROM 14, storage device 20, imager 22, display device 24, input device 26, GPS module 30, electronic compass 32, and acceleration sensor 34.

The storage device 20 includes a tangibly embodied non-transitory computer-readable storage medium, such as a hard disk or semiconductor memory, which may store programs or instructions to be executed by CPU 10. The storage device 20 may be non-removable or removable. The data stored in the storage device 20 may be dynamically obtained from an external database, when the image processing device 100 performs image processing. Moreover, storage device 20 may be embodied in different remote devices or servers in a cloud computing configuration.

The imager 22 is configured as a camera module with an image pickup device, such as a charge coupled device (CCD) or complementary metal oxide semiconductor (CMOS). The display device 24 displays an image on a screen, such as a liquid crystal display (LCD), organic light emitting diode (OLED), or plasma display panel (PDP). The input device 26 includes a button, keypad, touch panel, or pointing device, etc. for a user of the image processing device 100 to input information to the image processing device 100.

The GPS module 30 receives the GPS signal transmitted from the GPS satellite to calculate an actual latitude, longitude, and altitude, etc. where the image processing device 100 is located. The electronic compass 32 detects the actual orientation of the image processing device 100. The acceleration sensor 34 detects acceleration caused by a force acting on the image processing device 100.

1-2. Logical Configuration

Figure 2:
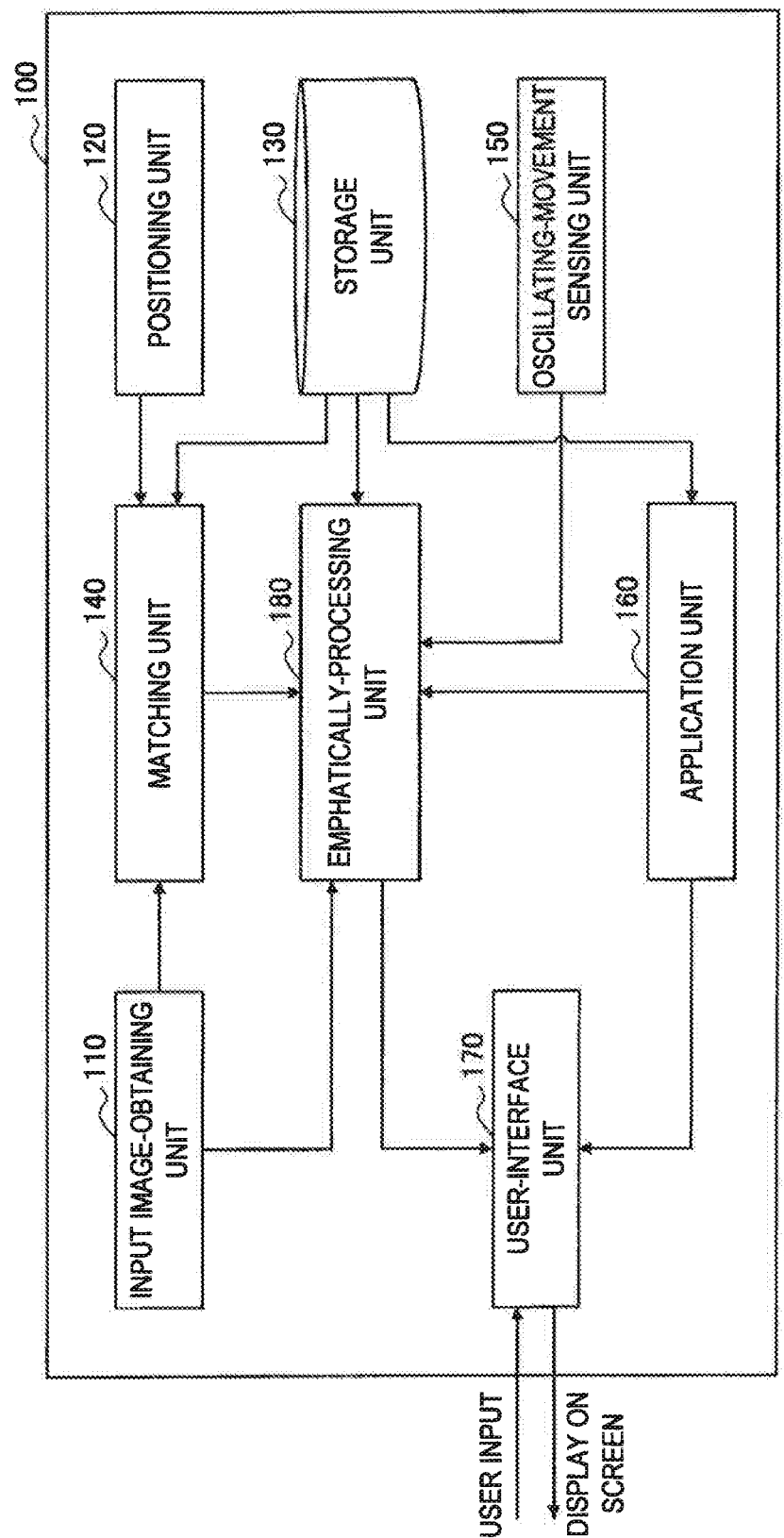
FIG. 2 is a block diagram illustrating an example of a logical configuration of an image processing device according to an embodiment.

FIG. 2 is a block diagram illustrating an example of a logical configuration of the image processing device 100 according to the present embodiment. Referring to FIG. 2, the image processing device 100 includes an input-image obtaining unit 110, a positioning unit 120, a storage unit 130, a matching unit 140, an oscillating-movement sensing unit 150, an application unit 160, a user-interface unit 170, and an emphasizing-process unit 180. As used herein the term "unit" may be a software module, a hardware module, or a combination of a software module and a hardware module. Such hardware and software modules may be embodied in discrete circuitry, an integrated circuit, or as instructions executed by a processor.

(1) Input-Image Obtaining Unit

The input-image obtaining unit 110, i.e. capturing unit, obtains, with the imager 22, a series of input images in which the view in the real world around a user is captured. That is, an input image of a physical object, or objects, in the real world is captured. Then, the input-image obtaining unit 110 sequentially outputs the obtained input images to the matching unit 140 and emphasizing-process unit 180.

Figure 3:
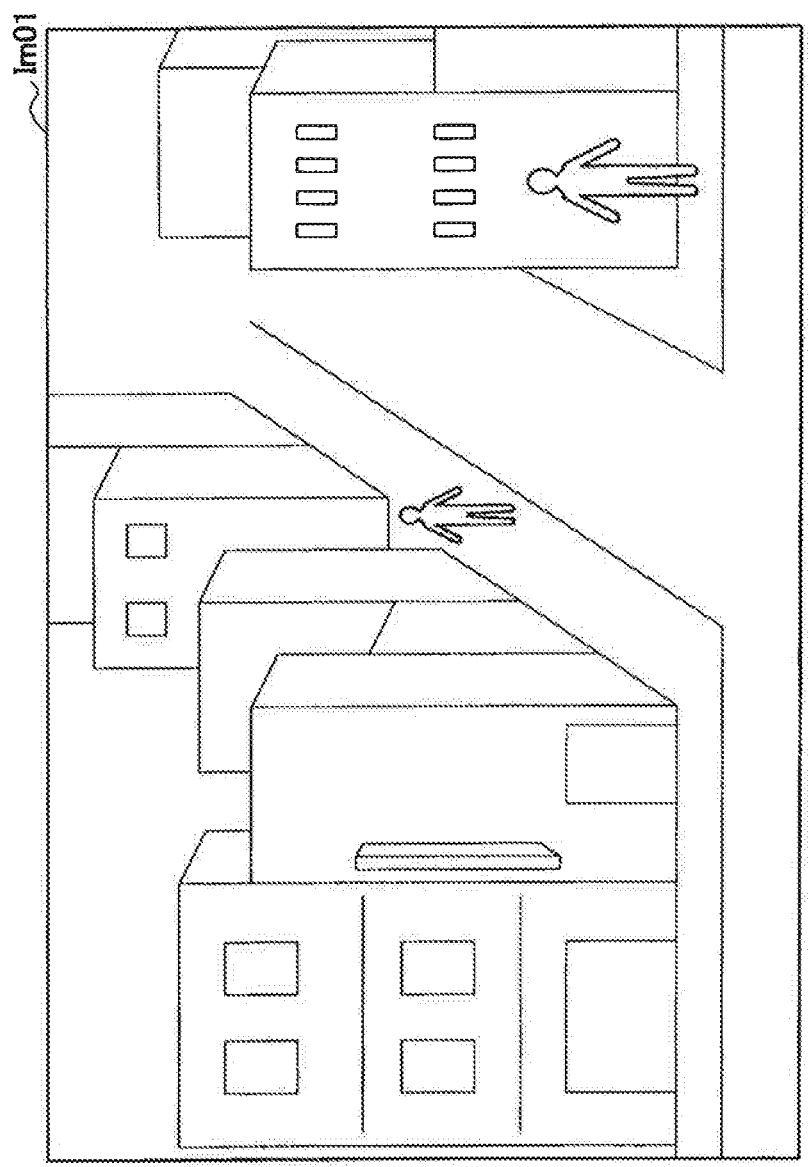
FIG. 3 is an explanatory view illustrating an example of an input image.

FIG. 3 is an explanatory view illustrating an example of an input image obtained by the input-image obtaining unit 110. Referring to FIG. 3, a town, as the real space in which a user who carries the image processing device 100 (or a vehicle equipped with the image processing device 100, etc.) is present, appears in the input image. There are multiple buildings or facilities in the town. Each of such objects that appear in the input image may be a target for a geographic information search in the application unit 160 described below, or a target for which the user is guided in navigation using a navigational device.

(2) Positioning Unit

The positioning unit 120 determines the current location of the image processing device 100 with the GPS module 30. The positioning unit 120 also determines the actual orientation of the image processing device 100 with the electronic compass 32. The positioning unit 120 then outputs location information, such as the latitude, longitude, and altitude, and azimuth information of the image processing device 100 obtained as a result of the measurement described above, to the matching unit 140.

(3) Storage Unit

The storage unit 130 stores a three-dimensional model that describes a three-dimensional shape and a location of an object that is present in the real world. Examples of the object described by the three-dimensional model include an object relating to the above-mentioned application function, such as the geographic information search or navigation provided by the application unit 160. The three-dimensional shape and the location of objects, such as a restaurant, an office, a school, a station, a communal facility, and a landmark that are present in a town, are described by the three-dimensional model. The three-dimensional model may be described using a language, such as Geography Markup Language (GML) or KML based on GML.

Figure 4:
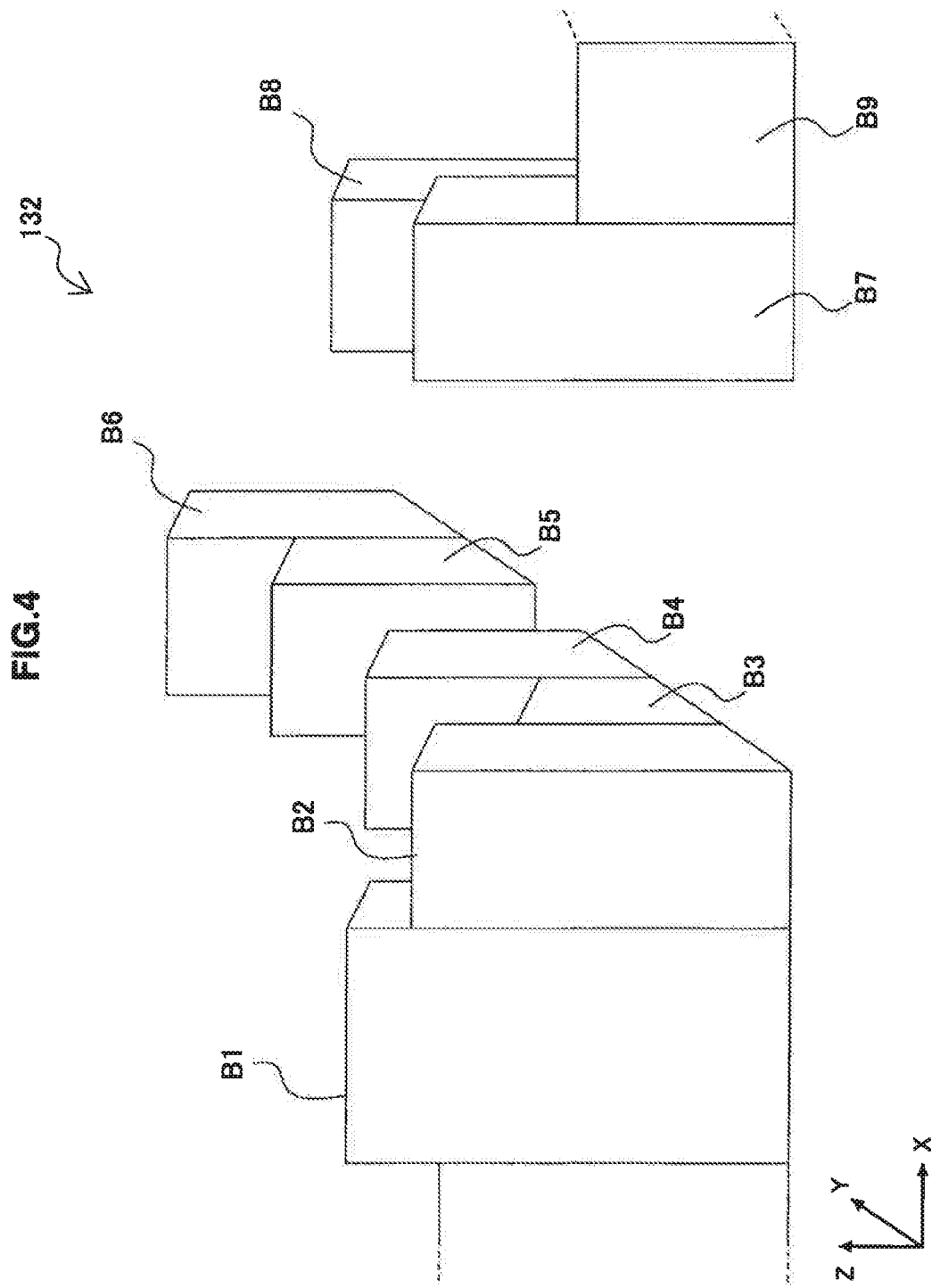
FIG. 4 is an explanatory view for explaining an example of a three-dimensional model.

FIG. 4 is an explanatory view for explaining an example of the three-dimensional model. Referring to FIG. 4, a three-dimensional model 132 is partially depicted by way of example. In the example shown in FIG. 4, the three-dimensional model 132 includes data on nine objects B1 to B9 that are buildings respectively. For each of these objects, the three-dimensional model 132 defines, for example, an identifier of an object (hereinafter, "object ID"), a name of a building, and three-dimensional location of vertices that form the shape of the building, and the predetermined texture. In practice, a three-dimensional model stored by the storage unit 130 may include data on a larger number of objects (in a more widespread area) than a group of objects illustrated in FIG. 4. Associated with these objects, the storage unit 130 may also store additional information, such as a rating by users for a facility, such as a restaurant or hotel, used by users.

It is to be appreciated that storage unit 130 may be embodied in different remote devices or servers in a cloud computing configuration, and that the three-dimensional model may therefore be retrieved from storage unit 130 via a network in response to a remote request for a three-dimensional model from image processing device 100, instead of accessing a local storage of image processing device 100.

(4) Matching Unit

The matching unit 140 associates an object included in a three-dimensional model around a current location determined by the positioning unit 120, with an object that appears in an input image by matching feature points of the object included in the three-dimensional model and feature points in the input image. More specifically, in the present embodiment, the matching unit 140 first extracts data on objects around the current location of the image processing device 100 from a three-dimensional model stored in the storage unit 130 based on location and azimuth information input from the positioning unit 120. The matching unit 140 also sets feature points in an input image according to a well-known corner detecting method, such as Harris method or Moravec method. The matching unit 140 matches the feature points of the group of objects extracted from the three-dimensional model, and the feature points set in the input image. Accordingly, the matching unit 140 can recognize the correspondence of the object included in the three-dimensional model to the object that appears in the input image. As a result of matching, the matching unit 140 may also determine the detailed location and posture of the image processing device 100. The location of the image processing device 100 determined by the process of matching described here may have a higher accuracy than the location accuracy that the positioning unit 120 can achieve with the GPS module 30.

Figure 5:
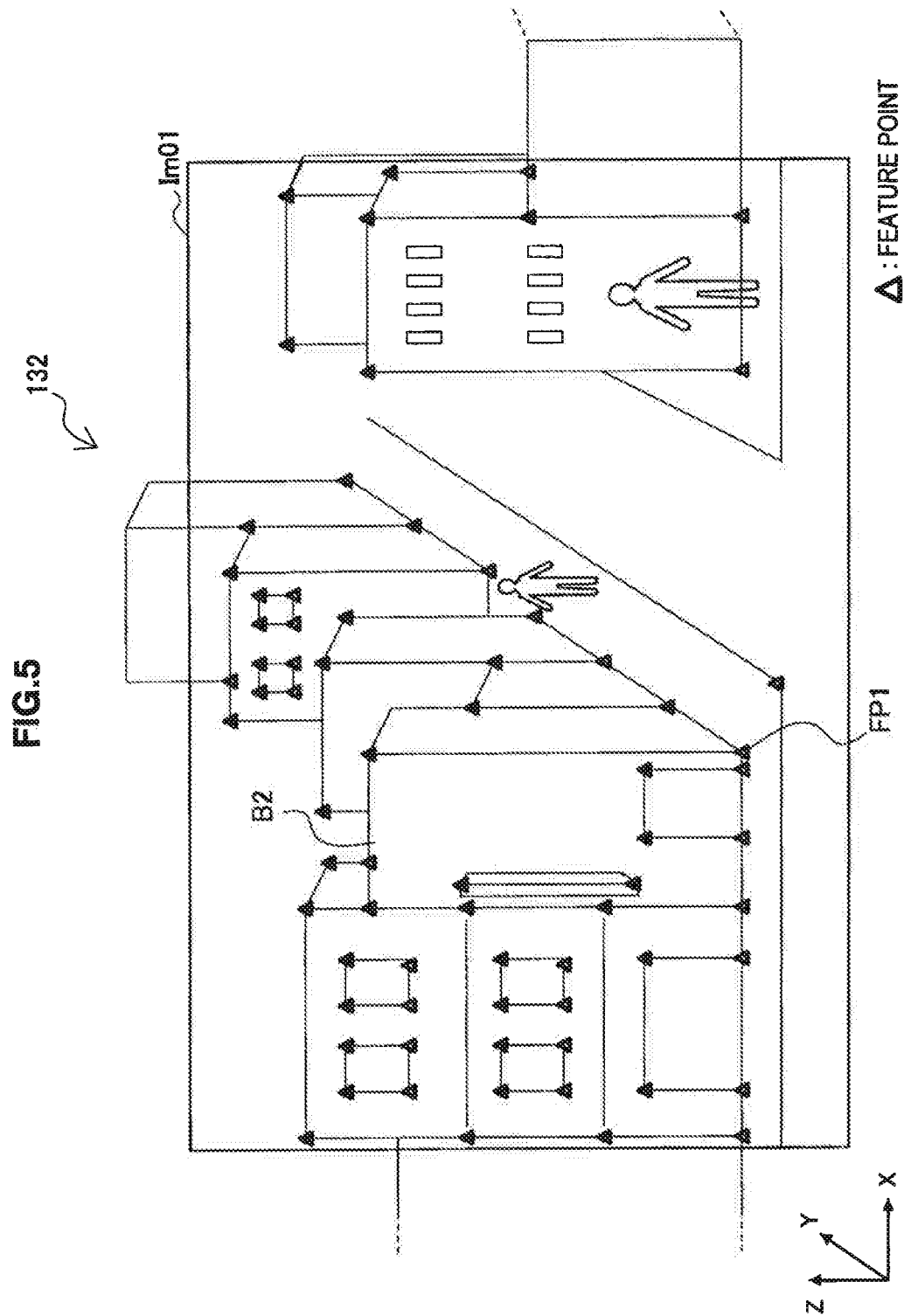
FIG. 5 is an explanatory view illustrating an example of a result of a process of matching by a matching unit according to an embodiment.

FIG. 5 is an explanatory view illustrating an example of a result of a process of matching by the matching unit 140. Referring to FIG. 5, many triangle-shaped feature points are set in each corner of the objects that appear in an input image Im01. Each of these feature points in the input image Im01 matches each corresponding vertex of the objects included in the three-dimensional model 132 in a specific location and posture of the image processing device 100. For example, a feature point FP1 matches one of the vertices of an object B2 of the three-dimensional model 132. Thus, the matching unit 140 can recognize at what position in an input image each object included in a three-dimensional model appears.

(5) Oscillating-Movement Sensing Unit

The oscillating-movement sensing unit 150, i.e. sensor unit, detects that the image processing device 100 is shaken with the acceleration sensor 34. Upon detecting that the image processing device 100 is shaken, the oscillating-movement sensing unit 150 in turn outputs an oscillating-movement sensing signal to the emphasizing-process unit 180. The oscillating-movement sensing unit 150 may determine that the image processing device 100 is shaken, for example, when acceleration acting on the image processing device 100 exceeds a predetermined threshold.

(6) Application Unit

The application unit 160, i.e. processing unit, is a processing block that achieves the above-illustrated application function associated with geographic information service. The application function that the application unit 160 provides includes, for example, geographic information search function or navigation function. The application unit 160 makes, for example, the user-interface unit 170 display an application screen. When a user enters a search keyword via the application screen, the application unit 160 searches the storage unit 130 for the object that complies with the entered search keyword. The application unit 160 outputs object designating information that designates one or more objects specified as the search result, to the emphasizing-process unit 180. The object designating information may be, for example, information that designates an object selected by the user as a destination of navigation, (7) User-Interface Unit The user-interface unit 170 provides a user interface to use the above-described application function, to a user. The user-interface unit 170 receives user input information, such as a search keyword for geographic information search function or a destination of navigation, for example, via the input device 26. The user-interface unit 170 also displays the application screen generated by the application unit 160 with the display device 24. Furthermore, the user-interface unit 170 displays, for example, an emphasized image generated by the after-mentioned emphasizing-process unit 180 in the application screen.

(8) Emphasizing-Process Unit

The emphasizing-process unit 180 generates an emphasized image that emphatically displays each of one or more designated objects among objects included in a three-dimensional model (hereinafter, "designated object") by processing the partial image in an input image corresponding to each of the above-described designated objects. In the present embodiment, for example, when object designating information is input from the application unit 160, e.g. an identifier of a physical object is received, the emphasizing-process unit 180 determines whether an designated object appears in an input image based on the object designating information. Next, when the designated object appears in the input image, the emphasizing-process unit 180 recognizes the area in the input image corresponding to the designated object based on a result of the above-described matching by the matching unit 140. The emphasizing-process unit 180 then processes the partial image in the recognized area such that the designated object corresponding to the received identifier is emphasized. The partial image processed and generated by the emphasizing-process unit 180 is referred to as an emphasized image or emphasized partial image in this specification. The emphasizing-process unit 180 generates an output image by superimposing the emphasized image onto the input image and makes the user-interface unit 170 display the generated output image using a display generator that generates signals representing the output image.

Figure 6:
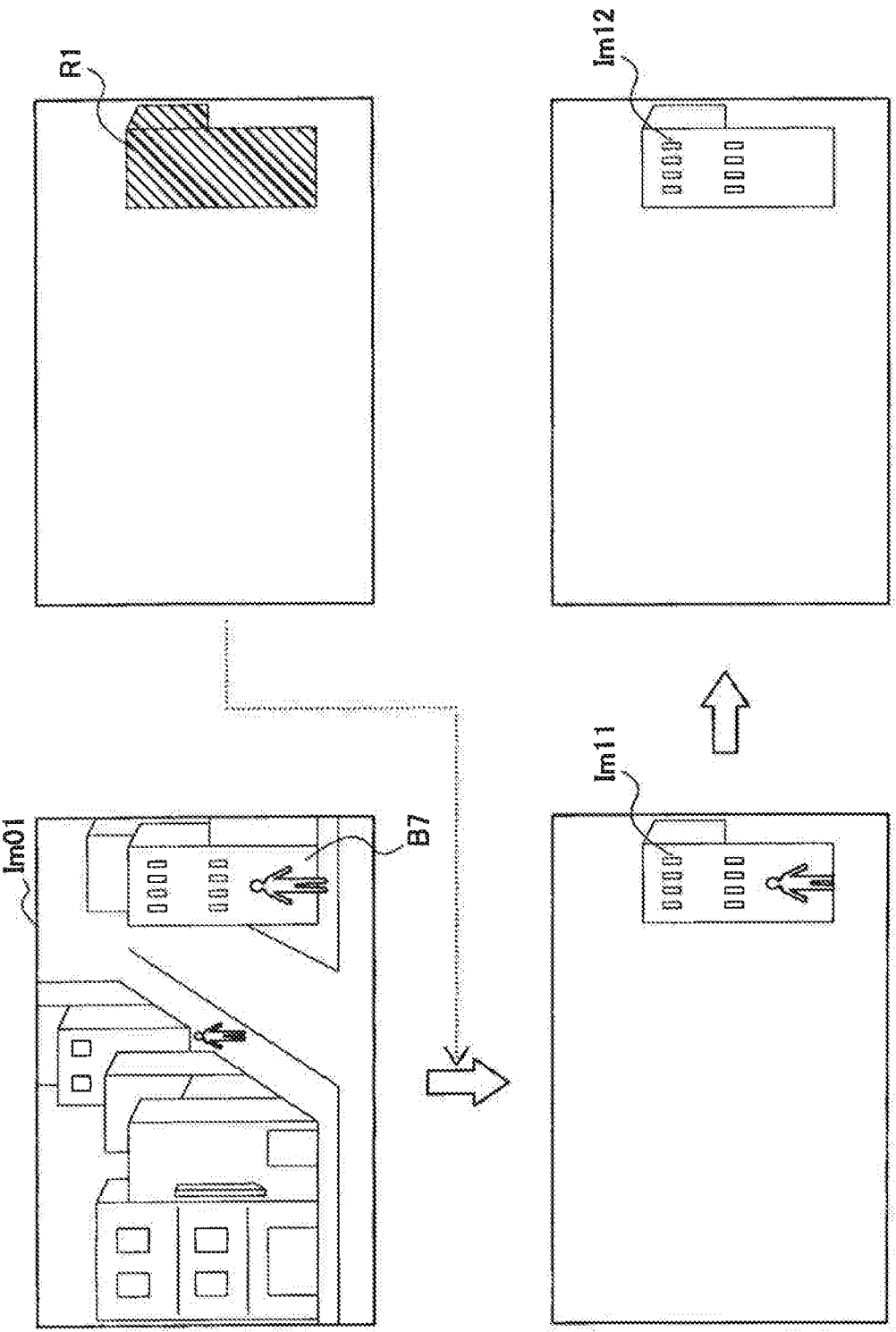
FIG. 6 is an explanatory view for explaining a process of extracting a partial image by an emphasizing-process unit according to an embodiment.

FIG. 6 is an explanatory view for explaining a process of extracting a partial image by the emphasizing-process unit 180 according to the present embodiment. An input image Im01 is shown in the top left-hand corner of FIG. 6. By way of example, it is assumed that object designating information input from the application unit 160 designates an object 137 that appears in the input image Im01, An area R1 that is recognized as a result of matching by the matching unit 140 and is corresponding to the designated object B7, is shown in the top right-hand corner of FIG. 6. The emphasizing-process unit 180 extracts a partial image Im11 of such an area R1 from the input image Im01 (see the bottom left-hand corner of FIG. 6). A moving object that appears in the input image Im01 may overlap on the partial image Im11 in some cases. In the example shown in FIG. 6, a person overlaps in front of the designated object B7. In that case, the emphasizing-process unit 180 generates a partial image Im12 in which the effect of the moving object is reduced, for example, by averaging multiple partial images Im11 over multiple frames.

In the next section, three examples of processes of emphasizing by the emphasizing-process unit 180 will be described in detail to generate an above-described emphasized image from a partial image extracted in this way.

2. Examples of Processes of Emphasizing

Figure 7:
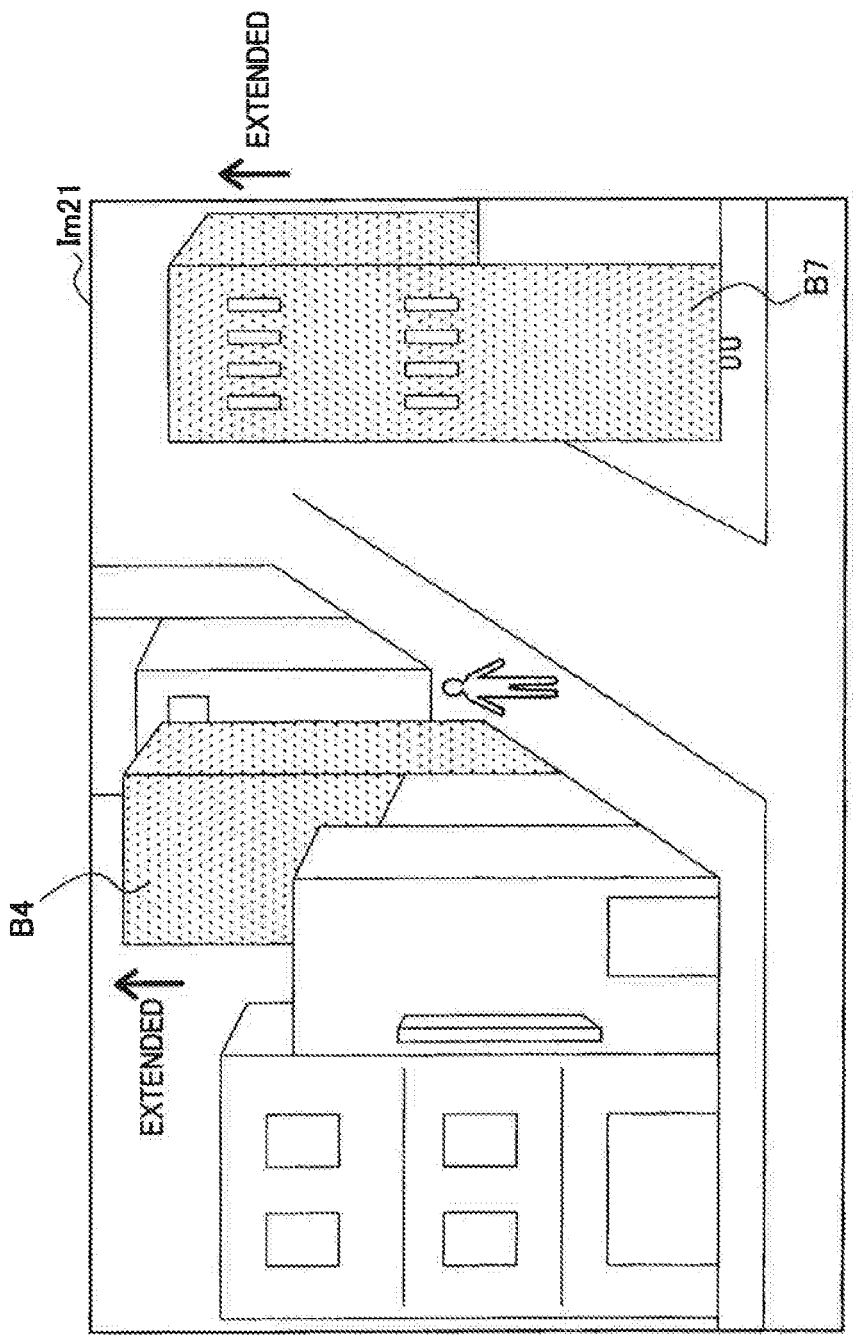
FIG. 7 is an explanatory view for explaining a first example of a process of emphasizing by an emphasizing-process unit according to an embodiment.
Figure 8:
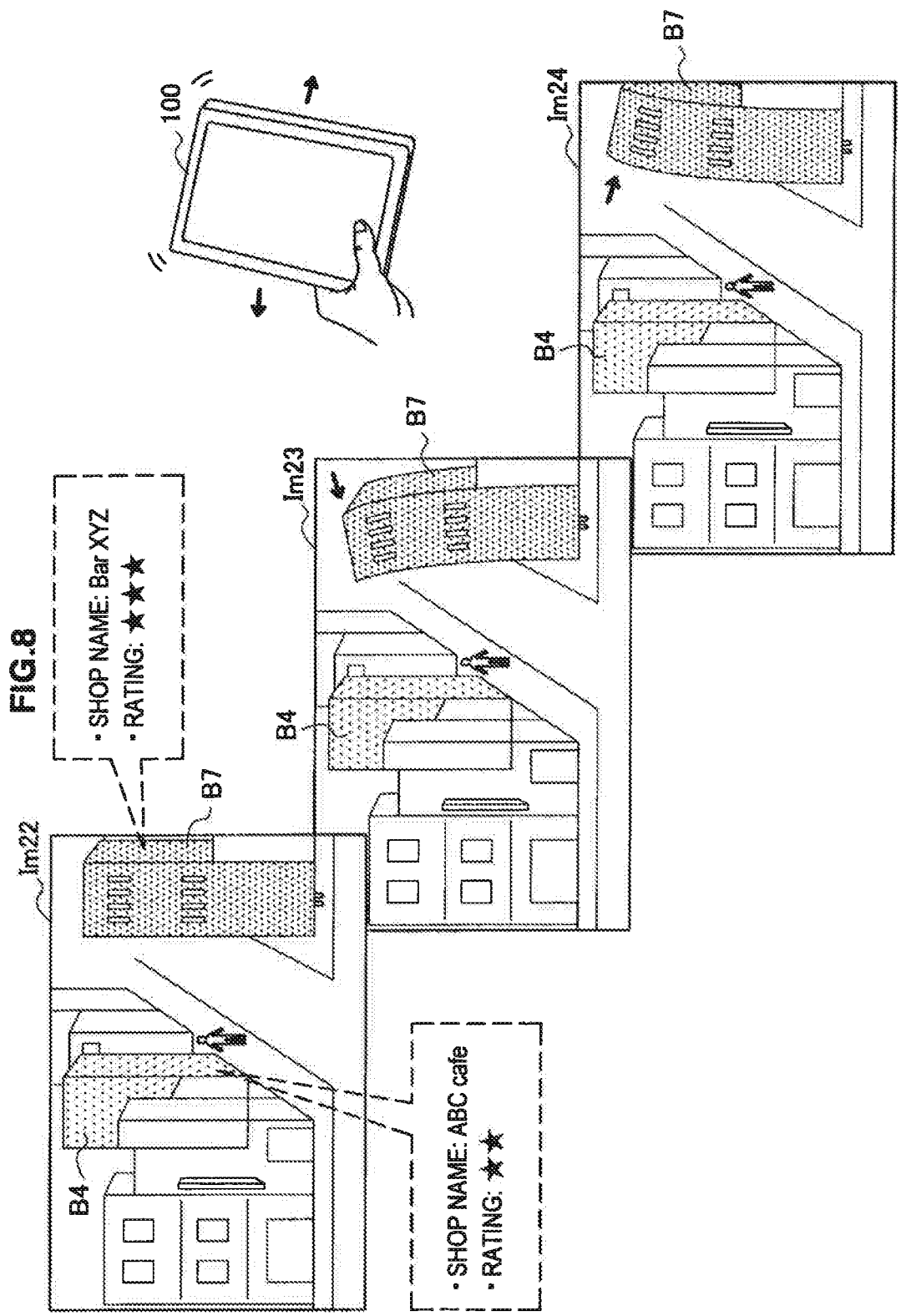
FIG. 8 is an explanatory view for explaining a second example of a process of emphasizing by an emphasizing-process unit according to an embodiment.
Figure 9:
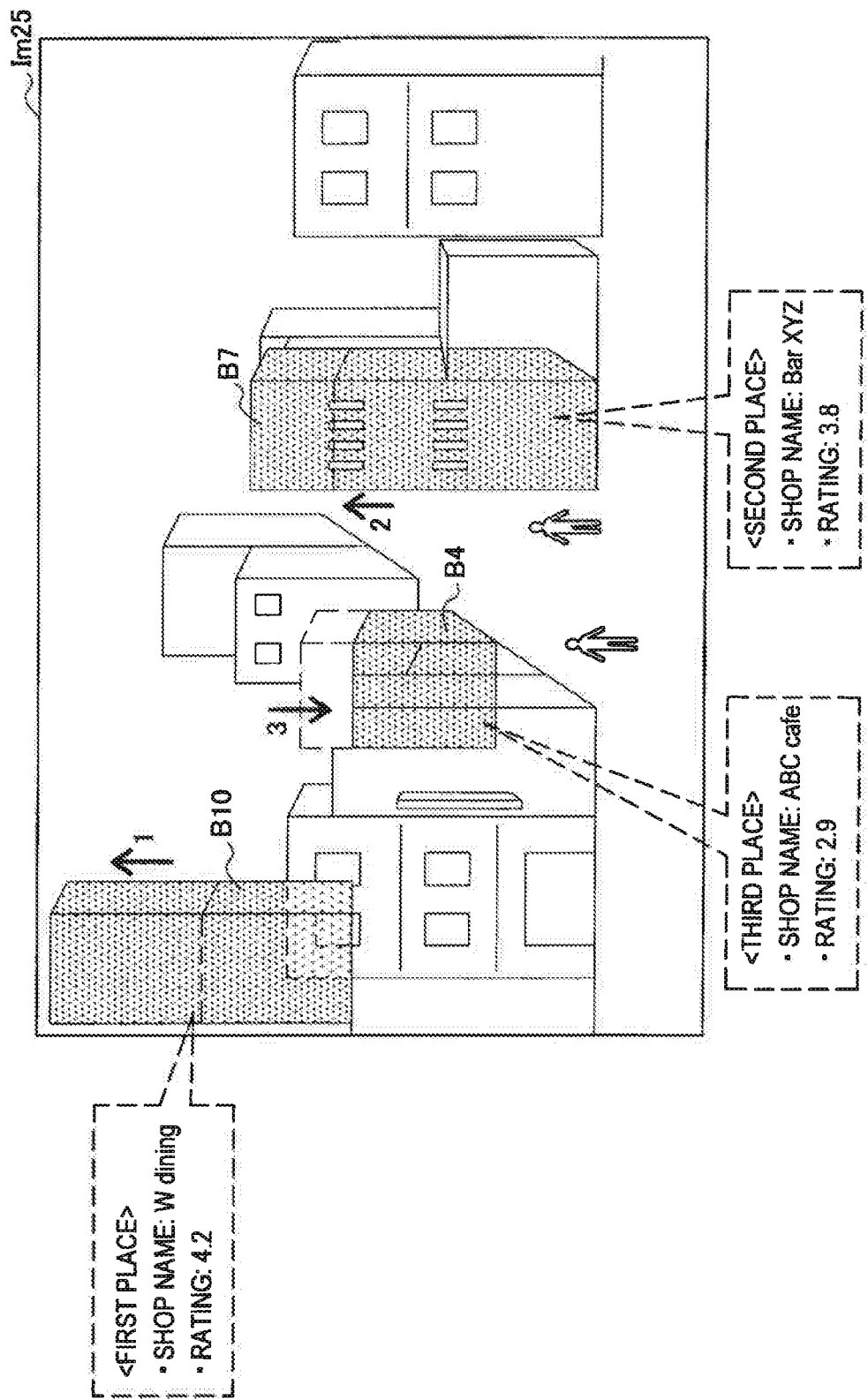
FIG. 9 is an explanatory view for explaining a third example of a process of emphasizing by an emphasizing-process unit according to an embodiment.

FIGS. 7 to 9 are explanatory views for explaining an example of a process of emphasizing by the emphasizing-process unit 180 according to the present embodiment respectively.

2-1. First Example

In a first example of the process of emphasizing, it is assumed that the objects B4 and B7 included in the three-dimensional model 132 illustrated in FIG. 4 are designated by object designating information. Referring to FIG. 7, an output image Im21 generated by the emphasizing-process unit 180 in the first example is shown. By comparison between the output image Im21 and the input image Im01 in FIG. 3, it will be understood that the size of the designated objects B4 and B7 (especially height) is extended in the image. Thus, the emphasizing-process unit 180 may emphasize a designated object by modifying the size of the partial image corresponding to the designated object. Instead (or additionally), the emphasizing-process unit 180 may emphasize a designated object by modifying the shape, color, or brightness of the partial image corresponding to the designated object, or by modifying a portion of the three-dimensional model corresponding to the designated object.

The emphasizing-process unit 180 may directly generate an emphasized image (shaded portions in the output image Im21 of FIG. 7) that emphasizes each designated object by changing the size, shape, color, or brightness of the partial image. Instead, for example, the emphasizing-process unit 180 may remove distortion of a partial image in perspective, obtain a texture of each designated object, and paste the obtained texture on the surface of a polygon of each designated object to generate an emphasized image. Distortion of a partial image in perspective may be removed by performing affine transformation of the partial image depending on the location and posture of the image processing device 100 (the imager 22) determined by the matching unit 140. The use of the texture obtained in this manner also allows, for example, a portion of appearance of a designated object hidden by other objects in an input image to be visible in an output image (for example, some portions hidden by other objects are visible in the example shown in FIG. 9 described below).

2-2. Second Example

Also, in a second example of the process of emphasizing, it is assumed that the objects B4 and B7 included in the three-dimensional Model 132 illustrated in FIG. 4 are designated by object designating information. By way of example, it is also assumed that the objects 34 and 37 are designated as a result of a restaurant search, and two pieces of additional information of "a shop name" and "a rating" are associated with each object. For example, referring to FIG. 8, the shop name of the designated object B4 is "ABC Cafe," and the rating is two-star. On the other hand, the shop name of the designated object 37 is "Bar XYZ," and the rating is three-star. Additional information is not limited to this example, and may be any information, such as an assumed budget and cooking style.

In the second example, the emphasizing-process unit 180, first, similar to the first example, emphasizes the designated objects B4 and B7 by modifying the size (or shape, color, or brightness) of the partial image corresponding to these designated objects B4 and B7. Furthermore, the emphasizing-process unit 180 generates a series of emphasized images that represent animation in which a designated object moves. This animation is, for example, animation in which a designated object shakes. The emphasizing-process unit 180 may generate such animation in which a designated object shakes, for example, when an oscillating-movement sensing signal that indicates that the image processing device 100 is shaken is input from the oscillating-movement sensing unit 150.

Referring to FIG. 8, output images Im22, Im23, and Im24 generated by the emphasizing-process unit 180 in the second example are shown. In the output image Im22, the above-described designated objects B4 and B7 are both emphasized using the method by which the size is extended, regardless of the detection result of oscillating-movement by the oscillating-movement sensing unit 150. On the other hand, the output images Im23 and Im24 are displayed when the oscillating-movement of the image processing device 100 is detected. In the output images Im23 and Im24, only the object B7 that is a restaurant rated highly (three-star) is emphasized using the method that uses animation in which a designated object shakes.

Thus, the use of animation in which a designated object moves ensures that a desired designated object is distinct from the other objects in the input image. Therefore, a user can find a desired object very easily by reference to the output image. Animation in which an object moves is not limited to the example described above and may be animation in which an object is, for example, elongated and contracted, or jumping.

Also, as discussed previously, multiple designated objects to be presented to a user and particularly noteworthy designated objects (for example, a highly-rated restaurant with many stars, or a restaurant that suits the user's budget) of them all, can be displayed in such a way that the user can distinguish between them easily, by classifying the designated objects into two or more groups according to additional information (such as the number of stars, or the user's budget) and emphasizing the designated objects using different methods in a phased manner according to the above classification. The method by which user's shaking the image processing device 100 triggers a designated object to be shaken also achieves an effective user interface that presents geographic information that is more intuitive and easy for users to remember.

2-3. Third Example

In a third example of a process of emphasizing, it is assumed that the objects B4, B7, and a object B10 are designated by object designating information. Similar to the second example, it is also assumed that two pieces of additional information of "a shop name" and "a rating" are associated with each object. In the third example, however, it is assumed that "a rating" is given as a numerical value and a rank order according to the magnitude of the numerical value is given. For example, the rating of the designated object B4 is 2.9, and the rank order is third place. The rating of the designated object B7 is 3.8, and the rank order is second place. The rating of the designated object B10 is 4.2, and the rank order is first place.

In the third example, when the multiple ranked objects are designated in this manner, the emphasizing-process unit 180 modifies the size of a partial image corresponding to each of the multiple designated objects according to the rank order of each designated object. In the example shown in FIG. 9, in an output image Im25, the designated object B10 is displayed the tallest, the designated object B7 is displayed the second tallest, and the designated object B4 is reduced to be the smallest of all the designated objects.

Thus, the modification of the size of a designated object according to additional information, such as a rank order, given to the designated object allows a user to understand not only the location information on the designated object but also the additional information intuitively and easily.

3. Example of Flow of Image Processing

Figure 10:
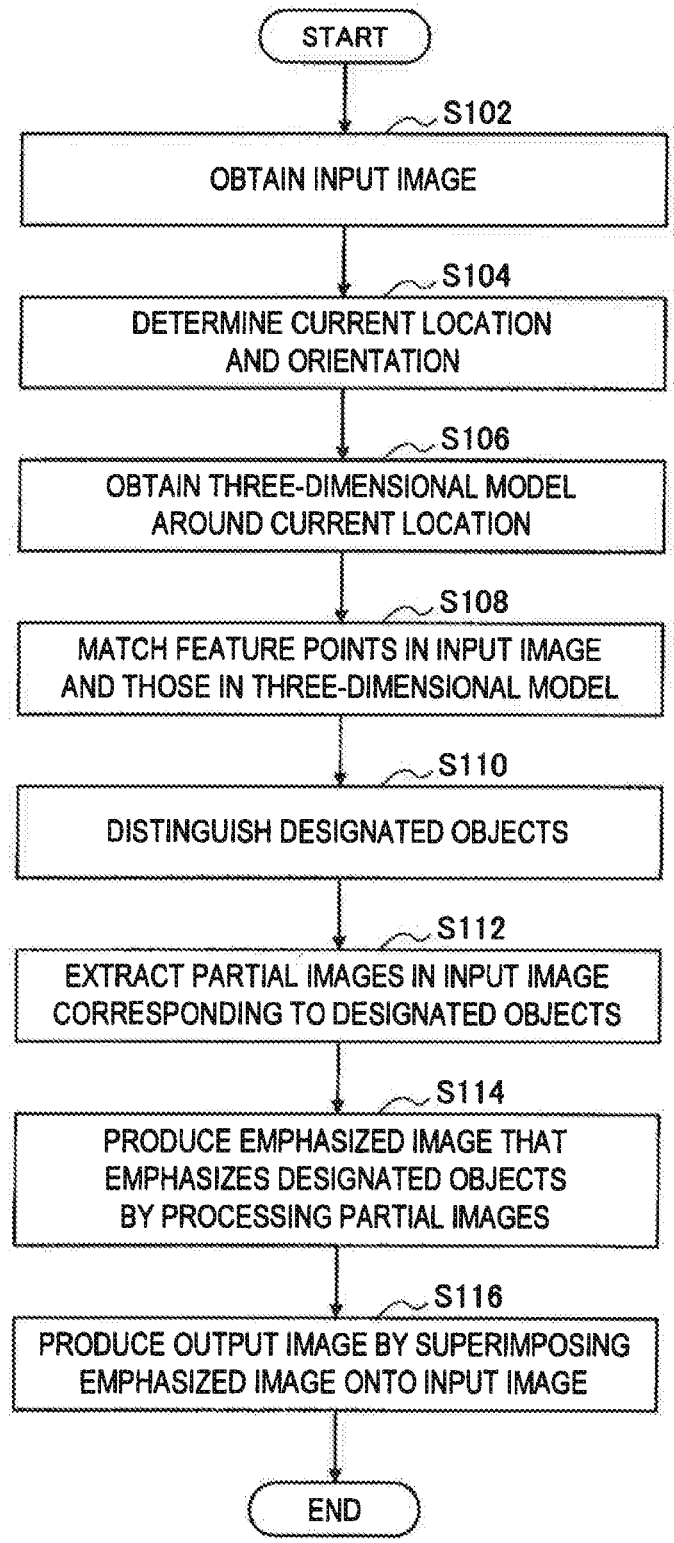
FIG. 10 is a flowchart illustrating an example of a flow of image processing according to an embodiment.

FIG. 10 is a flowchart illustrating an example of a flow of image processing by the image processing device 100 according to the present embodiment. Referring to FIG. 10, first, the input-image obtaining unit 110 obtains input images in which the view in the real world around a user is captured (step S102). The positioning unit 120 also determines the current location and orientation of the image processing device 100 (step S104). Next, the matching unit 140 may retrieve a three-dimensional model corresponding to the current location, and obtain data on objects around the current location of the image processing device 100 from the corresponding three-dimensional model stored in the storage unit 130 (step S106). Next, the matching unit 140 matches the feature points set in the input image with the feature points of the group of objects included in the obtained three-dimensional model (step S108). Next, when object designating information is input from the application unit 160, the emphasizing-process unit 180 distinguishes one or more designated objects designated by the object designating information (step S110). Next, the emphasizing-process unit 180 extracts partial images of areas in the input image corresponding to the designated objects using the three-dimensional model (step S112). Next, the emphasizing-process unit 180 generates the emphasized image that emphasizes the designated objects by processing and modifying the extracted partial images (step S114). Alternatively, a portion of the three-dimensional model may be modified to generate an emphasized image. The emphasizing-process unit 180 generates an output image by superimposing the generated emphasized image onto the input image (step S116). The output image generated in this manner is displayed on the screen of the display device 24 via the user-interface unit 170.

4. Conclusion

An embodiment of the present disclosure has been described with reference to FIGS. 1 to 10. According to the present embodiment, an emphasized image that emphasizes a designated object is generated and displayed by processing a partial image in an input image corresponding to the designated object in a three-dimensional model designated by the application function. Therefore, a designated object is emphatically displayed while natural appearance that appears in an input image from the viewpoint of the imager 22 mounted on the image processing device 100 that a user uses is kept. Accordingly, it can be easy for a user to find a designated object, such as a desired building or facility, in the real space.

For example, the use of a series of emphasized images that represent animation in which a designated object moves also allows a user to recognize the desired object very easily. The modification of a designated object in an output image also allows a user to understand additional information, such as a rank order, intuitively and easily.

The method by which user's shaking the image processing device 100 triggers animation in which a designated object is shaken in an output image to be displayed also associates a motion of a user with an emphasized image, and the method can achieve an intuitive and easy-to-follow user interface that presents geographic information.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
    circuitry configured to:
        acquire an input image of a real world;
        acquire a measurement result associated with a position and a posture of a portable device;
        acquire a three-dimensional model, wherein the three-dimensional model indicates a shape and a location of at least one object of interest of a plurality of objects within the real world by a plurality of feature points;
        generate at least one three-dimensional virtual object as a counterpart to the at least one object of interest of the plurality of objects within the real world, wherein a shape and a location of the at least one three-dimensional virtual object is based on the shape and the location of each object of interest in the three-dimensional model; and
        cause a display to display the at least one three-dimensional virtual object onto the at least one object of interest so as to modify display of the shape of the at least one object of interest,
    wherein the shape of each object of the at least one object of interest is modified in response to a sensed movement of the display with an acceleration greater than a predetermined threshold acceleration while the at least one object of interest is displayed on the display, and
    wherein the shape of each object of the at least one object of interest is modified by using a predetermined animation including at least one of shaking, elongating and contracting, or jumping.

2. The image processing apparatus according to claim 1, wherein the circuitry is further configured to extract the plurality of feature points for each object of interest of the plurality of objects.

3. The image processing apparatus according to claim 2, wherein the circuitry is further configured to match at least one feature point of the plurality of extracted feature points for each object with one or more of the shape and the location of the at least one generated three-dimensional virtual object.

4. The image processing apparatus according to claim 1, wherein the predetermined animation extends a size of the at least one three-dimensional virtual object displayed onto the at least one object of interest.

5. The image processing apparatus according to claim 1, wherein the predetermined animation shakes the at least one three-dimensional virtual object displayed onto the at least one object of interest.

6. The image processing apparatus according to claim 1, wherein the at least one object of interest is selected from the plurality of objects based on respective ratings of the plurality of objects within the real world.

7. The image processing apparatus according to claim 6, wherein the respective ratings of the plurality of objects are determined based on a numerical value of each object.

8. The image processing apparatus according to claim 7, wherein numerical value of each object is used to determine a rank order of the plurality of objects.

9. The image processing apparatus according to claim 1, wherein the circuitry is further configured to extract at least one partial image from the input image of the real world.

10. The image processing apparatus according to claim 9, wherein, when it is determined that there is a moving object that overlaps the at least one extracted partial image, the circuitry is further configured to average a plurality of extracted partial images to generate a single partial object in which an effect of the moving object is reduced.

11. The image processing apparatus according to claim 1, wherein the circuitry is further configured to initiate a storage into a computer-readable medium of the three-dimensional model.

12. The image processing apparatus according to claim 1, wherein the circuitry is further configured to acquire the measurement result based on a detected movement of the portable device.

13. An image processing method, performed via at least one processor, the method comprising:
acquiring an input image of a real world;
acquiring a measurement result associated with a position and a posture of a portable device;
acquiring a three-dimensional model, wherein the three-dimensional model indicates a shape and a location of at least one object of interest of a plurality of objects within the real world by a plurality of feature points;
generating at least one three-dimensional virtual object as a counterpart to the at least one object of interest of the plurality of objects within the real world, wherein a shape and a location of the at least one three-dimensional virtual object is based on the shape and the location of each object of interest in the three-dimensional model; and
causing a display to display the at least one three-dimensional virtual object onto the at least one object of interest so as to modify display of the shape of the at least one object of interest,
wherein the shape of each object of the at least one object of interest is modified in response to a sensed movement of the display with an acceleration greater than a predetermined threshold acceleration while the at least one object of interest is displayed on the display, and
wherein the shape of each object of the at least one object of interest is modified by using a predetermined animation including at least one of shaking, elongating and contracting, or jumping.

14. A non-transitory computer-readable medium having embodied thereon a program, which when executed by a computer, causes the computer to execute a method, the method comprising:
acquiring an input image of a real world;
acquiring a measurement result associated with a position and a posture of a portable device;
acquiring a three-dimensional model, wherein the three-dimensional model indicates a shape and a location of at least one object of interest of a plurality of objects within the real world by a plurality of feature points;
generating at least one three-dimensional virtual object as a counterpart to the at least one object of interest of the plurality of objects within the real world, wherein a shape and a location of the at least one three-dimensional virtual object is based on the shape and the location of each object of interest in the three-dimensional model; and
causing a display to display the at least one three-dimensional virtual object onto the at least one object of interest so as to modify display of the shape of the at least one object of interest,
wherein the shape of each object of the at least one object of interest is modified in response to a sensed movement of the display with an acceleration greater than a predetermined threshold acceleration while the at least one object of interest is displayed on the display, and
wherein the shape of each object of the at least one object of interest is modified by using a predetermined animation including at least one of shaking, elongating and contracting, or jumping.

15. The image processing apparatus according to claim 1, wherein the at least one object of interest comprises a plurality of objects of interest, and
wherein the shape of each object of the plurality of objects of interest is modified such that a size of each object corresponds to a respective rating of the object.

16. The image processing apparatus according to claim 1, wherein the sensed movement of the display comprises an oscillating movement that indicates that the display is shaken by a user.

* * * * *